Nov. 26, 1957     J. M. CAMPBELL ET AL     2,814,504
VEHICLE SAFETY BELT

Filed Jan. 3, 1956     3 Sheets-Sheet 1

INVENTORS
JOHN M. CAMPBELL
JULIA A. CAMPBELL
BY Pyle and Fisher
ATTORNEYS

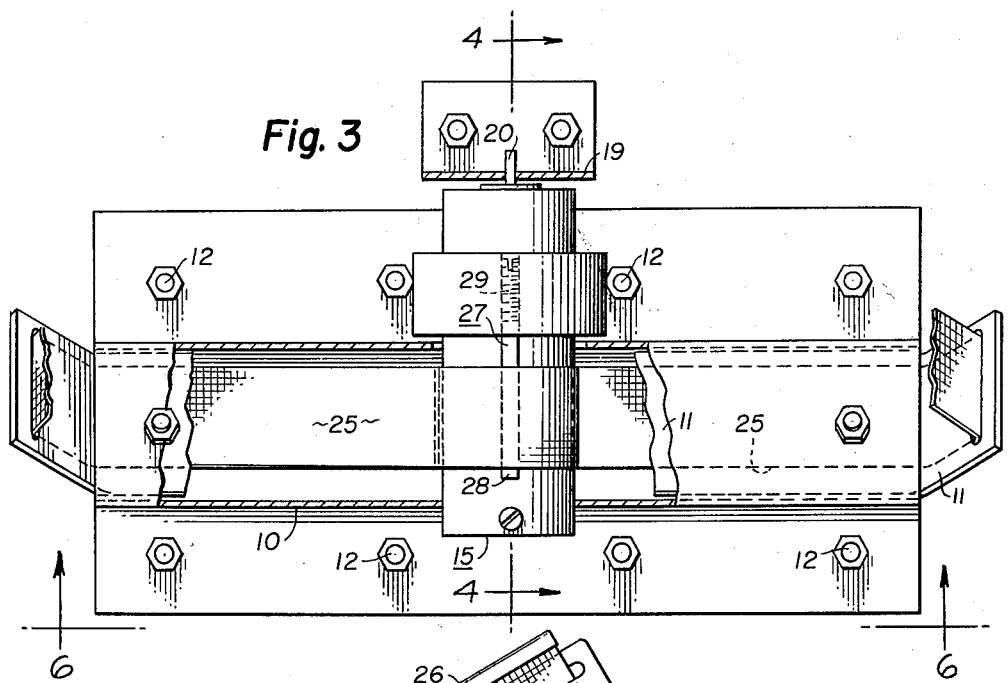
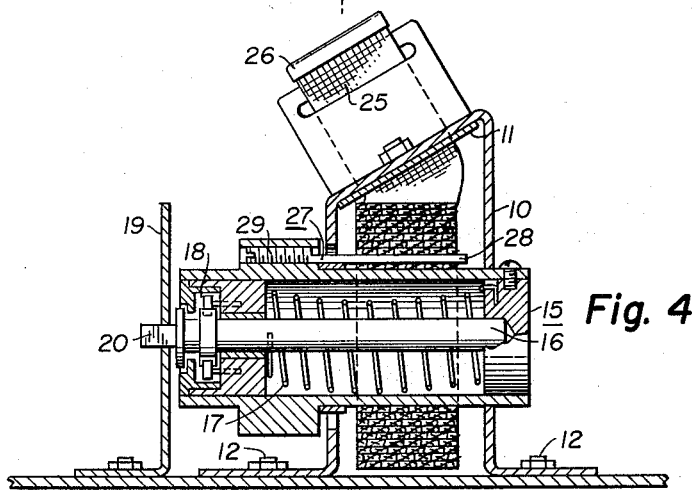
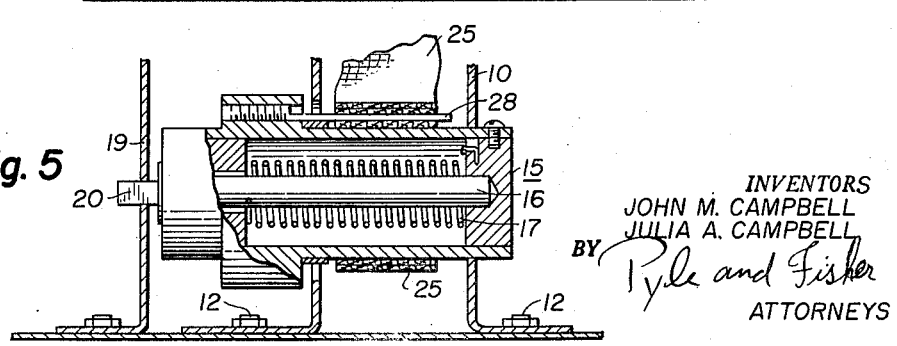

Nov. 26, 1957  J. M. CAMPBELL ET AL  2,814,504
VEHICLE SAFETY BELT

Filed Jan. 3, 1956  3 Sheets-Sheet 3

INVENTORS
JOHN M. CAMPBELL
JULIA A. CAMPBELL
BY
ATTORNEYS

United States Patent Office 2,814,504
Patented Nov. 26, 1957

2,814,504

VEHICLE SAFETY BELT

John M. Campbell and Julia A. Campbell, Cleveland, Ohio

Application January 3, 1956, Serial No. 556,931

5 Claims. (Cl. 280—150)

This invention relates in general to safety devices for motor vehicles, and relates more particularly to a seat belt for safely retaining a person in a seat against the forces of inertia.

The first object of this invention is to provide a belt device which eliminates stress concentrating stitching, riveting, or other anchor means which may tear loose under extreme force and defeat the purpose of the safety belt.

Another object of this invention is to provide a take-up device for a seat belt in order to avoid the appearance and nuisance of loose seat belts lying over the seat surface while not in use.

Other objects and a fuller understanding of the invention may be had by referring to the following description and claims, taken in conjunction with the accompanying drawings, in which:

Figure 3 is a top plan view of the device shown in Figure 2;

Figure 4 is a sectional view through the device taken substantially along the line 4—4 of Figure 3;

Figure 6:
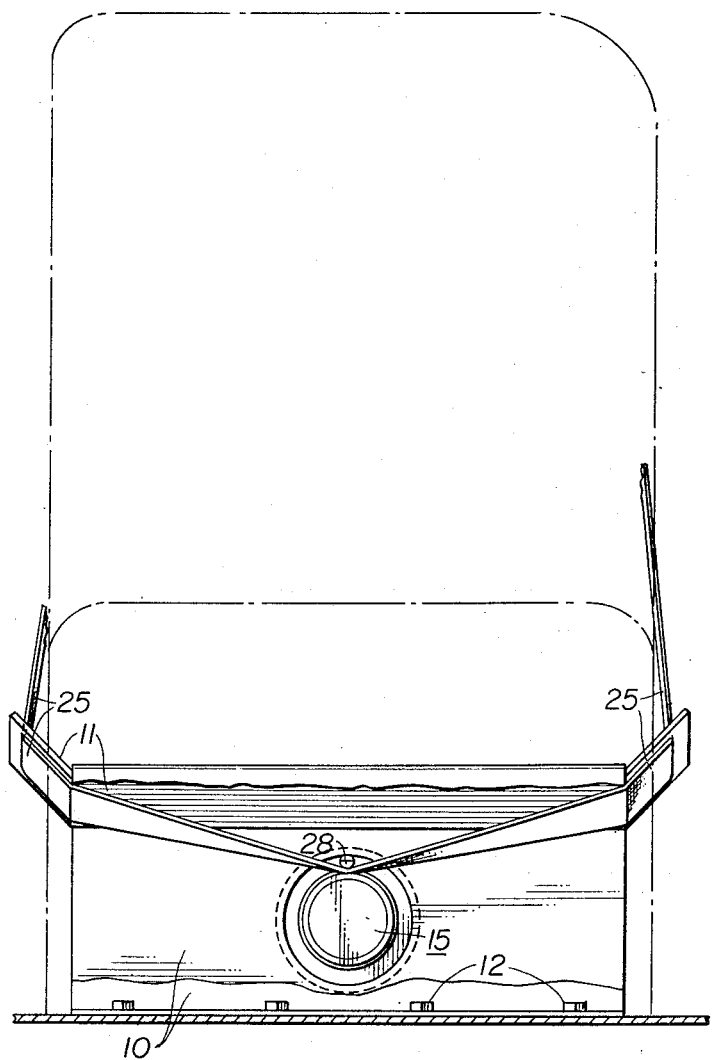

Figure 5 is a sectional view taken along the same line 4—4 with the device in a different stage of operation; and, Figure 6 is a rear view of the device as taken along the line 6—6 of Figure 3, with a portion of the frame 10 broken away to reveal the strap and anchor plate relationship, the strap being extended to maximum position in this figure.

Although safety seat belts have long been used in all kinds of vehicles, their most prevalent use at the present time is in aircraft for carrying personnel. Recently, there has been an active interest in adapting safety belts and other safety devices to motor vehicles. Accordingly, there have been many different types of belt structures proposed, but most generally the belts are simply fastened to anchor devices on the floor of the vehicle and lay in a loose fashion across the seat unless a passenger actually occupies the seat with the belt in fastened position around the passenger. Accordingly, the belts are both a nuisance and an unattractive sight when not in use. Accordingly, the present invention provides a very convenient means for storing a safety seat belt device out of sight when not in actual use.

However, removal of the belt from sight alone will not make the belt any more safe for its intended purpose than another belt. Most safety belts are in two pieces and two separate anchor devices are employed to attach the belt to the framework of the vehicle. Whether this statement is universally true or not, it is true that these devices quite generally employ sewn loops or riveted attachments in some portion of the belt to anchor the belt to the vehicle. Any sharp return of a flexible belting, any sewing, riveting, or other means of fastening, and any ring or similar anchor device, will greatly concentrate the stress applied to the anchoring device and will tend to cause a shearing action which materially reduces the strength of the belt. This invention provides for a long, flat surface for anchoring the belt under extreme force conditions and employs a one-piece belt between the attachment ends where the belts are joined about the passengers.

Figure 1:
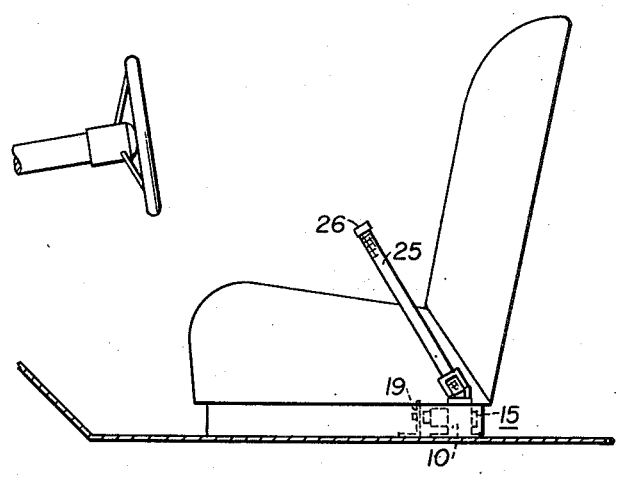
Figure 1 is a schematic side view of a motor vehicle seat with a safety belt device embodying the principles of this invention incorporated therewith.

In Figure 1 of the drawings, a fanciful representation of a driver's seat in a motor vehicle is set forth in order to illustrate the best location for the device of the present invention. A complete unit embodying the principles of this invention, and therefore almost uniformly installable into any type of passenger vehicle, is set forth as the preferred embodiment of this invention. It must be understood, however, that a built-in version of the invention may be employed rather than a compact unit that may be separately installed into the vehicle.

Figure 2:
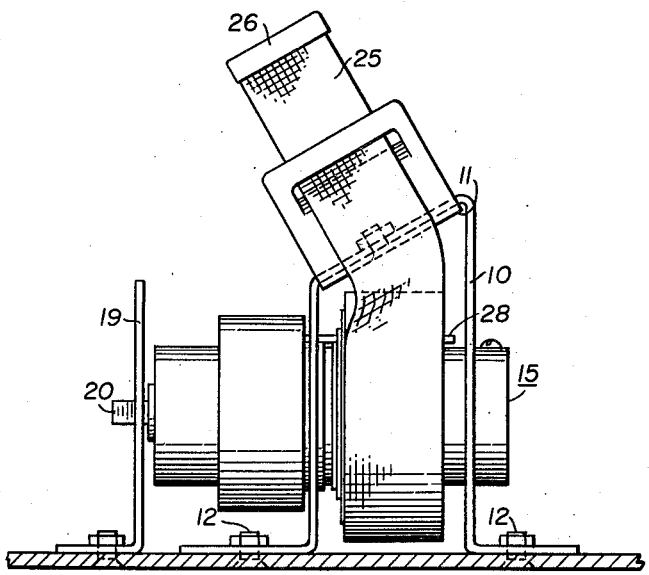
Figure 2 is a side view of a preferred embodiment of the invention as adapted for use with a motor vehicle.

In Figure 2 it will be seen that the device embodies a frame 10 which may be bolted to the frame or body of a vehicle, such as by means of bolts 12.

The first function of the frame 10 is to provide a longitudinally extending anchor plate 11 for retention of a safety belt under extreme forces. Such a safety belt is indicated by the reference character 25 in the drawings. The belt 25 is a one-piece belt in the sense that it is continuous from end to end without any foreign attachment or connecting device. Several lengths of individual cords or straps may be employed and may be considered as a continuous or one-piece construction. It is the absence of intermediate foreign connecting devices that is important in this invention. Such a one-piece, continuous construction is the strongest possible construction with a minimum of weight and size. Heretofore, with seat belts that are fastened in the conventional manner, the belt is massive and wide in order to have sufficient strength to resist the shearing stresses imposed upon such a belt by the anchoring device. A much lighter belt may be employed when a continuous length of belting is used. The belt 25 is preferably brought to attachable ends rather than being an endless device for convenience in placing the belt around the passenger. One end 26 appears in these drawings, and it will be readily appreciated with another such end is positioned on the opposite side of the seat from the end 26. Any suitable fastening device may be employed, and since such device is not a portion of the present invention, no device is illustrated or recommended.

The anchor plate 11 provides an anchor surface of considerable length against which the belt may lay and be supported under impact conditions to give the maximum retention of the belt without imposing any stress concentrations thereupon. Note that the ends of the anchor plate are turned up in a gentle curve in order to avoid any sharp end surfaces which might tend to shear the belt. The degree of extension of these end surfaces may be substantially as illustrated in the drawings, or extended as desired.

Preferaby, the anchor plate 11 is positioned in an angular position as shown best in Figures 2, 3 and 4. Therefore, if the belt extends along the bottom anchor surface of the anchor plate 11 the natural position of the belt will be maintained with no tendency of the belt to slip off the anchor surface or otherwise impose any undue stress concentration to the belt.

Below the anchor plate 11 a reel device 15 is provided for storing, taking up the belt under proper conditions, and feeding the belt out under other conditions. The reel 15 is in substantially all respects identical to the conventional window shade roller almost universally used for holding a window blind. Generally, such reel embodies a central shaft 16 with a torsion spring 17 permanently anchored at one end and revoluble with the reel on the other. A catch mechanism 18 is employed to permit the reel to be selectively held at any desired degree of rotational travel, and to permit the reel to draw the webbing around the reel in a rapid rewind without stopping. Such construction and operation is well known and understood. For convenience of mounting the reel 15, an upright member 19 is provided to serve as an anchor for a flat end 20 of the shaft 16, again in the manner of supporting a window blind roller.

The manner of attachment of the belt 25 to the reel 15 is unique in that the belt may be drawn from two ends simultaneously without defeating the safety feature of the unitary continuous length of belting. In order to provide such attachment, a clip member 27 having a finger portion 28 and a threaded end 29 is threadably carried by the reel 15 substantially in the manner illustrated in the Figures 4 and 5. The belt 25 is extended through the frame 10 under the anchor plate 11 and between the finger 28 and the surface of the reel 15. Thus, in normal use, the belt 25 is in contact with the anchor plate 11 only at the extreme ends thereof. In normal operation the belt extends in spaced relationship with respect to the anchor surface provided by plate 11.

In operation, therefore, after the belt has been threaded between the surface of reel 15 and the finger 28 as described, the reel 15 is rotated to wind the central portion of the belt around the reel. By this rotation, the belt is looped back upon itself and rolled around the surface of the reel 15 and consequently the extreme ends of the reel will be drawn in simultaneously and substantially uniformly. The capacity of the reel, or stop members, may be employed to limit the amount of the belt that may be reeled upon the reel 15. Therefore, when a passenger removes the belt, the ends of the belt may be given a slight tug to release the catch mechanism 18 and thereafter released to allow the reel 15 to take up the excess belting and pull the ends of the belt down alongside the seats to an out of the way position. When reinstalled upon a passenger, the ends are merely drawn up a sufficient and desired length and the catch mechanism 18 allowed to engage and hold the reel in a fixed position. Therefore, the belting lays loosely around the passenger without exerting any pull to create a discomforting feeling.

The take-up mechanism is provided for convenience and appearance, and has no function in the safety of the passenger under actual impact conditions. The belting is made sufficiently long to hold an adult passenger, but not sufficiently long to allow the passenger to move forward a dangerous distance. Under conditions where the passenger tends to move forward out of the seat, the belting will be withdrawn from the reel 15 until the belting is fully extended. At such moment, the belting will be in the original threaded position extending under the anchor plate 11 and between the finger 28 and the surface of the reel 15. However, finger 28 is quite small and of little strength. The finger 28 may, if desired, even be notched to provide for easy snapping of the finger for complete removal under any appreciable force. However, such notching is not essential if the finger is made sufficiently brittle and weak. Therefore, upon reaching the fully extended condition of the belt, a further force is applied to an extent greater than the holding ability of the finger 28, the finger 28 will allow the belting to separate from the reel device and fly upwardly into a fully supported condition against the under anchor surface of plate 11. The anchor plate then retards further movement of the belt and gives complete safety support of the belt under such impact conditions.

Accordingly, the present invention provides a device which permits a neat and convenient handling of the belt device, but completely eliminates the storage action and substitutes a strong, non-stressing anchor support when the belt is actually needed for the safety of the passenger.

The invention has been illustrated and described as a package unit which may be installed in any vehicle. It has been found that the invention may be built into a vehicle by forming the anchor plate 11 into the floor panel of the vehicle during original manufacture. The reel device is then attached under the floor in the same manner as heretofore described with respect to the installable package.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

1. In a passenger vehicle having a seat, the provision of a laterally extending anchor device positioned below the seating surface, said device having an extended lateral anchor surface fixedly located with respect to the vehicle, a take-up device below said anchor surface, said take-up device adapted to store a length of belting and to permit feed-out of the belting by a pulling force thereon, and a single length of belting, said belting having first and second end portions and a center portion, said center portion extending under said anchor surface and into take-up storage engagement with the take-up device, said first and second end portions extending upwardly from said anchor surface to said vehicle seat, whereby a belt is provided which has no stress concentrating unions or anchoring points.

2. In a passenger vehicle having a seat, the provision of a laterally extending anchor surface positioned below the seating surface in fixed relationship to said vehicle, a single length of belting having first and second end portions and a center portion, a take-up device under said anchor surface, said take-up device adapted to store a length of said belting and to permit feed-out of the belting by a pulling force thereon, said center portion of the belting extending under the said anchor surface and detachably secured to said take-up device, said belting being detachable from the take-up device by application of a predetermined pulling force upon the belting, said anchor surface serving as a catch and permanent anchor for the center portion of the belting upon detachment thereof from the take-up device.

3. A seat belt device for retaining human passengers in a vehicle seat, comprising, a housing member adapted to be secured to a permanent structure below and rearwardly of a vehicle seat, a take-up device within said housing, said take-up device adapted to store a length of belting and to permit feed-out of the belting by a pulling force thereon, a continuous belt structure carried by said take-up device, said belt structure having first and second end portions and a central portion, said first and second end portions extending from spaced openings of said housing, said central portion of the belting detachably connected to said take-up device and being detachable by a predetermined pulling force upon the belting, said housing serving as an interference member to prevent withdrawal of the belt structure in the event of separation of the belting from the take-up device.

4. A seat belt device for passenger vehicles, comprising, a frame with means for permanent attachment thereof to a vehicle, said frame including an elongated anchor surface with upwardly curved end portions, a take-up reel below said anchor surface, said take-up reel characterized by the provision of resilient means urging said reel to a rest position and catch means engageable to hold the reel in a rotated position with the resilient means under tension, a single length of belting having first and second end portions and a central portion, said central portion extending under said anchor surface along the length thereof, clip means attaching said central portion to one point on the surface of said reel, said clip means thereby causing the belting to wind upon the reel in a double thickness from both end directions to draw said first and second end portions to the reel simultaneously, said belting being releasable from said clip means upon application of a predetermined pulling force upon the belting after full extension thereof, whereby the belting is pulled into contact with the elongated anchor surface for anchor support thereof over an extended length of the belting for extreme force resistance and absence of stress concentration points.

5. In a passenger vehicle having a seat, the provision of an anchor device secured to a permanent structure below and rearwardly of a vehicle seat, said device having an extended lateral anchor surface, said anchor surface thereby being fixedly located with respect to the vehicle, a take-up device below said anchor surface, said take-up device adapted to store a length of belting and to permit feed-out of the belting by a pulling force thereon, and a single length of belting, said belting having first and second end portions and a center portion, said center portion extending under said anchor surface and into take-up storage engagement with the take-up device, said first and second end portions extending upwardly from said anchor surface to said vehicle seat, whereby a safety belt is provided with storage facilities which has no stress concentrating unions or anchoring points.

References Cited in the file of this patent
UNITED STATES PATENTS

| | | |
|---|---|---|
| 2,414,698 | Picard | Jan. 21, 1947 |
| 2,480,915 | George | Sept. 6, 1949 |
| 2,488,858 | Franz | Nov. 22, 1949 |
| 2,588,235 | Herrick | Mar. 4, 1952 |
| 2,740,642 | Atwood | Apr. 3, 1956 |